United States Patent [19]

Todorov

[11] Patent Number: 4,980,644
[45] Date of Patent: Dec. 25, 1990

[54] EARTHQUAKE DETECTING MAGNETOMETER WITH MOVABLE MAGNETIC COMPASS NEEDLE AND METHOD OF USING SAME

[76] Inventor: George D. Todorov, 4702 Livernois, Detroit, Mich. 48210

[21] Appl. No.: 341,120

[22] Filed: Apr. 20, 1989

[51] Int. Cl.$^5$ .................... G01V 3/40; G01R 33/038; G01C 17/06; G01W 1/00
[52] U.S. Cl. .................... 324/345; 33/355 R; 324/259; 340/601
[58] Field of Search ............... 324/323, 344, 345, 259; 33/345, 355 R, 364; 340/601; 367/185

[56] References Cited

U.S. PATENT DOCUMENTS

| | | | |
|---|---|---|---|
| 2,123,045 | 7/1938 | Hoare | 324/345 X |
| 3,024,412 | 3/1962 | Breen | 324/259 X |
| 3,142,122 | 7/1964 | Boepple | 324/259 X |
| 3,334,420 | 8/1967 | Stockton | 33/364 |
| 4,628,299 | 12/1986 | Tate et al. | 324/323 X |
| 4,724,390 | 2/1988 | Rauscher et al. | 324/344 |

Primary Examiner—Gerard R. Strecker

[57] ABSTRACT

An earthquake predicting magnetometer having a compass assembly with a graduated dial and an adjustbly positionable magnet assembly having magnetic poles oriented opposite the direction markings on the compass dial. The device is oriented to the cardinal points using the compass. Then the magnet is adjusted in proximity to the compass assembly until the magnet counterbalances the magnetosphere of the earth. This leaves the compass needle facing east or west. When the magnetosphere of earth weakens prior to a major seismic event, the compass needle will point to the south on a graduated scale on the dial, indicating an imminent quake of large magnitude.

2 Claims, 1 Drawing Sheet

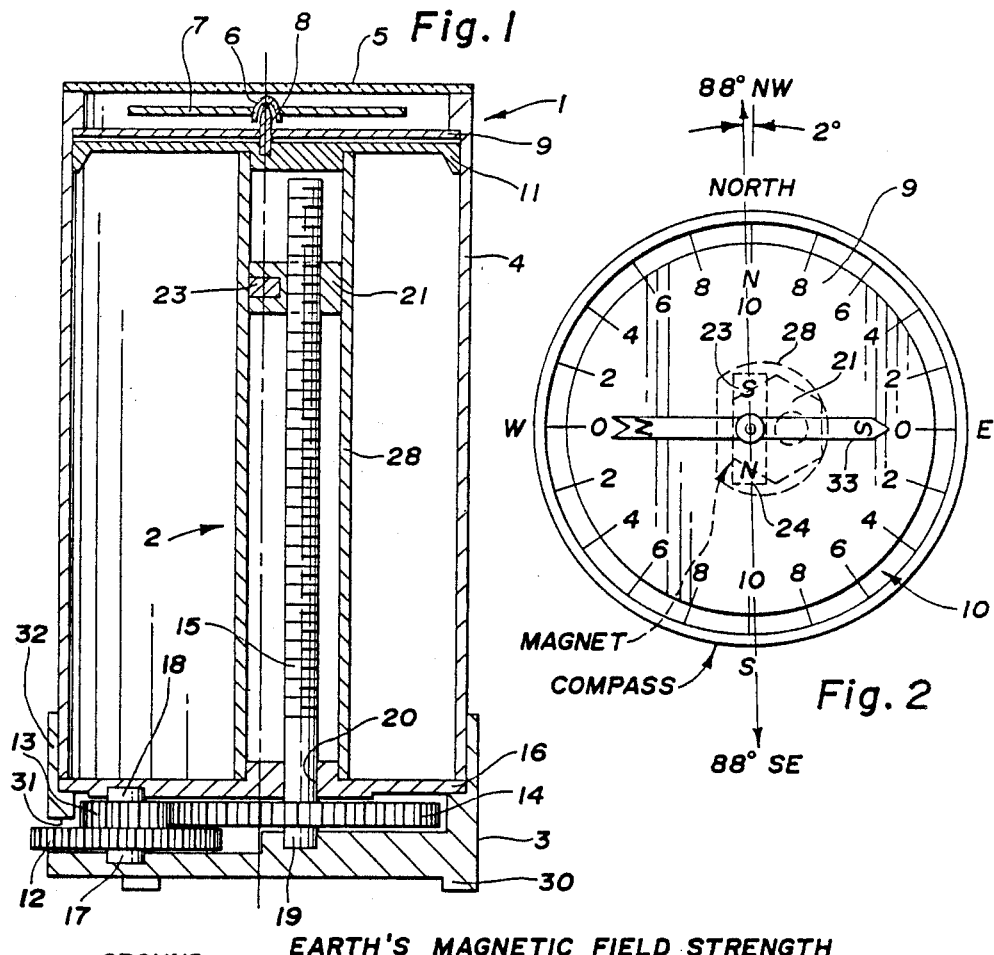
Fig. 1
Fig. 2
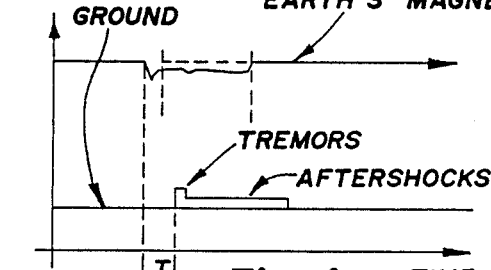
Fig. 4
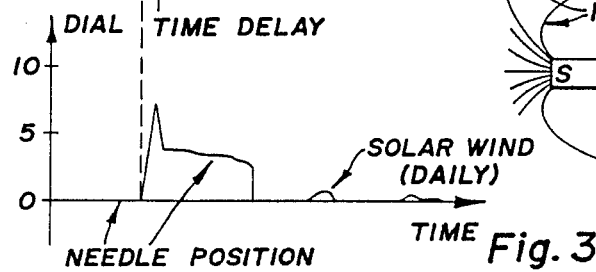
Fig. 3
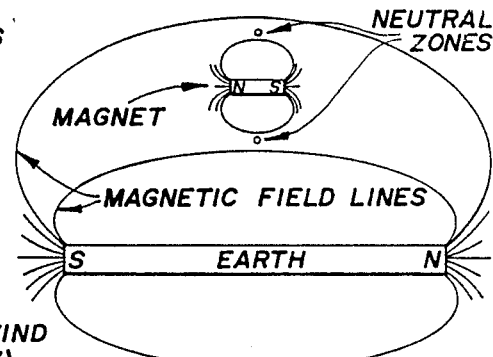
Fig. 5

EARTHQUAKE DETECTING MAGNETOMETER WITH MOVABLE MAGNETIC COMPASS NEEDLE AND METHOD OF USING SAME

BACKGROUND OF THE INVENTION

The present invention relates to a device and methods for predicting earthquakes by monitoring changes in the earth's magnetic filed, also referred to as the magnetosphere. Until very recently in mankind's history, earthquakes were considered unpredictable. With the advent of sophisticated seismographic devices for measuring tremors in the earth's crust, mankind has gained increased knowledge of seismology and attained a degree of predictability over earthquakes. Unfortunately, the devices in current use are beyond the financial and technological reach of the common man. It is now known to seismologists that disturbances in the earth's magnetosphere can occur due to the tremendous forces operating to produce earthquakes.

The present invention, a magnetometer, measures the change in the magnetosphere that occurs before large seismic events and gives notice that an earthquake will occur shortly. A drop in the strength of magnetosphere occurs generally within a 24 hour period before a large quake. The present invention detects and measures this drop, giving forewarning of an impending quake.

The present invention is technologically simple, affordable, and easily portable, thereby giving the public an earthquake predictor for home use that can be used independently of, or in conjunction with, more sophisticated devices and data usually available only to well funded agencies.

SUMMARY OF THE INVENTION

The present invention is a magnetometer and method of using same, which will detect that drop in strength of the earth's magnetosphere which appears shortly before a major earthquake. A major earthquake herein is defined as one that measures at least 6.0 on the Richter scale. These are the quakes that the preferred embodiment of the present invention will predict. The device includes a compass assembly indicating the cardinal points and also, preferably, a graduated scale to more easily determine the drop in strength of the magnetosphere. The device also includes a vertically movable magnet assembly having a magnet with poles oriented substantially opposite the magnetic poles of the earth i.e., when the compass points north and the device is oriented to point north, the south pole of the magnet points substantially north, preferably offset 2°. Alternatively, the compass assembly may be made movable in relation to a fixed magnet. A suitable base and protective cover are provided. Also provided is a tubular shield to surround and maintain placement of the movable magnet.

In use, the magnet and any other artificial magnetic fields are removed from influencing the compass. This is accomplished by selecting a remote location away from any structures and then lowering the magnet away from the compass needle. The device is then aligned to the cardinal points such that the needle points north or at any other point marked "10". The magnet is then placed in proximity to the compass so as to counterbalance the magnetosphere, bringing the compass indicator into stasis between the north pole of the magnet and the north pole of the earth, indicating either East or West on the compass dial. Between each of the cardinal points on the dial is a graduated scale. When the strength of the magnetosphere drops shortly before an earthquake occurrence, the compass needle will swing south, to the north pole of the movable magnet, along a graduated scale.

It is an object of the present invention to provide an earthquake prediction method that is inexpensive, simple, and easily portable; and readily available to the common man.

BRIEF DESCRIPTION OF THE DRAWINGS

FIG. 1 is a sectional view illustrating the device according to the present invention drawn at one-to-one scale.

FIG. 2 is a top view illustrating the compass assembly and movable magnet pole placement.

FIG. 3 is a graph showing dial scale reading versus time.

FIG. 4 is a graph showing magnetosphere strength and seismic activity versus time.

FIG. 5 is an illustration of the interaction between the magnetosphere of earth and the magnetic field of the magnet within the present invention.

DETAILED DESCRIPTION OF PREFERRED EMBODIMENTS

Referring to FIG. 1, there is shown a preferred embodiment of the magnetometer device according to the present invention. A compass assembly indicated generally at 1, rests atop a movable magnet assembly, indicated generally at 2, which rest atop a base 3. Preferably the device is enclosed by a protective casing 4 having a transparent top 5.

The compass assembly 1 includes a glass bearing 6 carrying a magnetic needle 7. The south pole of the needle is pointed and the north pole notched in the traditional fashion. The glass bearing 6 rests atop a steel spindle 8. As best seen in FIG. 2, underneath the magnetic needle 7 is a dial 9 which indicates the cardinal points and contains a scale 10 graduated from "0" at east to "10" at south. It is preferred that all cardinal points have graduated scales between them. The dial 9 rests upon a top plate 11 which overlies the movable magnet assembly 2 and contains the steel spindle 8. The steel spindle 8 lies at diametral center of the device. In the preferred embodiment, the device is cylindrical, being approximately the size and shape of a twelve ounce beverage can.

The movable magnet assembly 2 includes a thumbwheel 12 having gears 13 cooperating with a base gear 14 attached to and supporting a threaded shaft 15. The threaded shaft extends upward from the base gear through an opening 20 in bottom plate 16 to end in proximity to top plate 11.

The bottom plate 16 and base 3 are provided with recesses to hold the axles 17, 18, and 19 of thumbwheel 12 and base gear 14. The opening 20 in bottom plate 16 is located off of diametral center.

A magnet-carrying nut 21 is threadably secured onto threaded post 15. The nut 21 has a void enabling it to carry a magnet 23. The magnet 23 is located on diametral center due to the offset of threaded shaft 15. As best seen in FIG. 2, the poles of the magnet 23 are oriented opposite the north and south cardinal points on the compass dial 9. That is, the north pole 24 of magnet 23 faces the south point on the compass dial 9.

All parts except the magnet needle 7, the glass bearing 6, steel spindle 8, and magnet 23; are preferably made from plastic, although other suitable non-ferromagnetic materials may be used.

Surrounding the magnet-carrying nut 21 and threaded shaft 15, is a D-shaped cylinder 28 which provides a shield to guide the magnet-carrying nut and maintain the proper orientation of the magnet poles.

The base 3 of the preferred embodiment has a plurality of feet 30. It is contemplated that the feet may be adjustable as for instance mounted on bolts threaded into the base, to provide a leveling means for the device should this be necessary. The base 3 has an opening 31 which allows thumbwheel 12 to extend therefrom. Raised sidewalls 32 are provided to help secure protective casing 4.

In use thumbwheel 12 is turned to turn base gear 14. By this action threaded shaft 15 is rotated, moving magnet-carrying nut 21 in an upward or downward direction along threaded shaft 15. To orient the device with the cardinal points, nut 21 is moved downward until it has no effect on the magnetic needle 7 of compass assembly 1. The compass is then operated in the normal fashion orienting the "North" dial indication with the needle pointer 33. The magnet 23 is then moved upward until its magnetic field counterbalances the magnetosphere of earth. This stasis will be indicated by magnetic needle 7 pointing due east as shown in FIG. 2, or in the alternative, the needle may balance at the due west indicator when the stasis point is reached.

As illustrated in FIG. 5, this stasis point may be obtained by locating the magnet either above or below the compass. As illustrated in FIG. 5, the compass would be placed at one of those points indicated as a "neutral zone" in order to counterbalance the effect of the magnetosphere on the compass. It would then be possible to provide for movement of either the compass or the magnet, or both, in relation to each other, to achieve a balance of the magnetic fields of earth and the magnet of the device.

A sharp drop in the strength of the magnetosphere, which is known to precede major earthquakes, will then cause the needle pointer 33 to move along the scale 10. The scale reading will give some indication of the relative size of the imminent quake. One such device will not predict the epicenter location with any accuracy. However, when used as part of a far flung network of devices, subtle changes in the readings may help to identify a probable locus of the seismic event.

As illustrated by FIGS. 3 and 4 the peak drop in strength of the magnetosphere occurs before the onset of tremors, usually within 2 to 17 hours. The needle 7 will move up the scale 10 in response to this drop in strength. This is labeled the attack phase. After the needle peaks it enters the decay phase which lasts until the needle levels off at the lower level and longer lasting sustain phase. Attack and decay phases together usually last for several minutes. The sustain phase will generally last several days. When the sustain phase is complete a rapid release phase is entered wherein the needle returns to zero.

It will be seen by comparing FIGS. 3 and 4 that the indicator phases of the earthquake predictor are precursors to the seismic event phases. The attack and decay phases are precursors to the original seismic event and the sustain phase a precursor to the aftershocks.

Therefore, should the observer see an indication on the dial, he has only to observe for several minutes to determine if sustain phase has been reached. It should be noted that there will be a daily needle deflection of very small magnitude due to solar wind. This will not be easily confused with a deflection due to magnetosphere change.

The scale indications as shown in FIG. 2 will correspond roughly to a seismic measurement on the Richter scale.

While the present invention has been illustrated and described in connection with preferred embodiments, it is not to be limited to the particular structure shown, because many variations thereof will be evident to one skilled in the art and are intended to be encompassed in the present invention as set forth in the following claims.

What is claimed:

1. A device for detecting changes in the magnetosphere which precede an earthquake, comprising:
   a substantially sharp spindle;
   a magnetic compass needle including a glass bearing which rests upon said sharp spindle; a non magnetic protective cylindrical casing
   said spindle being set at the central axis of the casing of said device and surrounded by a horizontal dial, said spindle and dial being supported at one end of said casing by a D-shaped tube positioned within said casing said dial including graduated markings corresponding to the ratings of the Richter Scale with 10 at the north and south points and 0 at the east and west points; and
   a horizontal magnet which is adjustable vertically and retained in said D-shaped tube such that said magnet is moveable along the central axis of said device and restricted by said tube from rotating such that the south pole of said magnet faces north when point north of the dial is oriented to face north.

2. A method for predicting earthquakes by detecting changes in the magnetosphere which precedes such an occurrence, comprising;
   selecting a location absent of artificial magnetic fields;
   placing a device having a central axis in said location including a magnetic compass needle with a glass bearing which rests upon a substantially sharp spindle;
   said spindle being set at the central axis of said device and surrounded by a horizontal dial, which includes graduated markings corresponding to the ratings of the Richter Scale with 10 at the north and south points and 0 at the east and west points;
   said device further including a horizontal magnet which is adjustable vertically and retained in a D-shaped tube positioned beneath said dial such that said magnet is moveable along the central axis of said device and restricted by said tube from rotating such that the south pole of said magnet faces north when the point north of the dial is oriented to face north;
   orienting said device so the central axis of the device stands vertically toward the horizon and point north of the dial faces the magnetic north of the Earth;
   raising said horizontal magnet to influence said compass needle to counterbalance the effect of the magnetosphere such that said compass needle points east or west; and
   observing said compass needle for changes.

* * * * *